United States Patent
Hashimoto

(10) Patent No.: US 11,828,919 B2
(45) Date of Patent: Nov. 28, 2023

(54) IMAGING LENS

(71) Applicant: TOKYO VISIONARY OPTICS CO., LTD., Tokyo (JP)

(72) Inventor: Masaya Hashimoto, Sukagawa (JP)

(73) Assignee: TOKYO VISIONARY OPTICS CO., LTD., Tokyo (JP)

( * ) Notice: Subject to any disclaimer, the term of this patent is extended or adjusted under 35 U.S.C. 154(b) by 56 days.

(21) Appl. No.: 17/067,339

(22) Filed: Oct. 9, 2020

(65) Prior Publication Data
US 2021/0356710 A1    Nov. 18, 2021

(30) Foreign Application Priority Data

Oct. 10, 2019    (JP) .................................. 2019-186899

(51) Int. Cl.
*G02B 13/00*    (2006.01)
*G02B 9/62*    (2006.01)

(52) U.S. Cl.
CPC .......... *G02B 13/0045* (2013.01); *G02B 9/62* (2013.01)

(58) Field of Classification Search
CPC ......... G02B 13/0045; G02B 9/62; G02B 9/64
See application file for complete search history.

(56) References Cited

U.S. PATENT DOCUMENTS 9,726,857 B2 *   8/2017   Chen ................. G02B 13/0045
9,759,893 B2     9/2017   Jo
11,506,872 B2 *  11/2022  Huang ................... G02B 13/18
2017/0146776 A1* 5/2017   Kang ....................... G02B 9/62
2018/0188505 A1* 7/2018   Chang ................. G02B 13/143
2021/0157100 A1* 5/2021   Tokuno ............. G02B 13/0045
2022/0066171 A1* 3/2022   Li ...................... G02B 13/0045

FOREIGN PATENT DOCUMENTS

| CN | 109613683 A | * | 4/2019 | ......... G02B 13/0045 |
| JP | 2020160272 A | * | 10/2020 | ......... G02B 13/0045 |
| KR | 102427819 B1 | * | 8/2022 | ......... G02B 13/0045 |

* cited by examiner

*Primary Examiner* — George G. King
*Assistant Examiner* — Anna Elizabeth Smith
(74) *Attorney, Agent, or Firm* — Hamre, Schumann, Mueller & Larson, P.C.

(57) ABSTRACT

There is provided an imaging lens with excellent optical characteristics which satisfies demand of low profile and low F-number. An imaging lens comprising in order from an object side to an image side, a first lens with positive refractive power having an object-side surface being convex in a paraxial region, a second lens with negative refractive power in a paraxial region, a third lens with negative refractive power having an object-side surface being convex in a paraxial region, a fourth lens having an object-side surface being convex in a paraxial region, a fifth lens with negative refractive power in a paraxial region, and a sixth lens with positive refractive power having an image-side surface being convex in a paraxial region, and predetermined conditional expressions are satisfied.

7 Claims, 3 Drawing Sheets

IMAGING LENS

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in the following Patent Document 1 has been known.

Patent Document 1 (U.S. Pat. No. 9,759,893B) discloses an imaging lens comprising, in order from an object side, a first lens, a second lens, a third lens, a fourth lens, a fifth lens, and a sixth lens, a relationship between the distance from an object-side surface of the first lens to an image plane and a focal length of the overall optical system, and a relationship between an abbe number of the first lens and an abbe number of the third lens satisfy a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface (a surface being convex)", "a concave surface (a surface being concave)" or "a flat surface (a surface being flat)" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

Means for Solving Problems

An imaging lens according to the present invention comprises, in order from an object side to an image side, a first lens with positive refractive power having an object-side surface being convex in a paraxial region, a second lens with negative refractive power in a paraxial region, a third lens with negative refractive power having an object-side surface being convex in a paraxial region, a fourth lens having an object-side surface being convex in a paraxial region, a fifth lens with negative refractive power in a paraxial region, and a sixth lens with positive refractive power having an image-side surface being convex in a paraxial region.

The first lens achieves reduction in a profile by strengthening the refractive power. Furthermore, when the first lens has the object-side surface being convex in the paraxial region, spherical aberration and distortion are properly corrected.

The second lens properly corrects the spherical aberration, chromatic aberration, coma aberration, astigmatism, and the distortion.

The third lens properly corrects the chromatic aberration, the coma aberration, the astigmatism, and the distortion. Furthermore, when the third lens has the object-side surface being convex in the paraxial region, the coma aberration and the astigmatism are more properly corrected.

The fourth lens properly corrects the astigmatism and the distortion. Furthermore, when the fourth lens has the object-side surface being convex in the paraxial region, the astigmatism and the distortion are more properly corrected.

The fifth lens properly corrects the chromatic aberration, the astigmatism, field curvature and the distortion.

The sixth lens achieves reduction in a profile and properly corrects the spherical aberration, the astigmatism, the field curvature and the distortion. Furthermore, when the sixth lens has the image-side surface being convex in the paraxial region, a light ray incident angle to an image sensor is appropriately controlled. As a result, a lens diameter of the sixth lens can be reduced and reduction in a diameter of the imaging lens can be achieved.

According to the imaging lens having the above-described configuration, it is preferable that the first lens has an image-side surface being convex in the paraxial region.

When the first lens has the image-side surface being convex in the paraxial region, the coma aberration and the astigmatism can be properly corrected.

According to the imaging lens having the above-described configuration, it is preferable that the second lens has an object-side surface being convex in the paraxial region.

When the second lens has the object-side surface being convex in the paraxial region, the coma aberration, the astigmatism and the distortion can be properly corrected.

According to the imaging lens having the above-described configuration, it is preferable that the fifth lens has an object-side surface being concave in the paraxial region.

When the fifth lens has the object-side surface being concave in the paraxial region, a light ray incident angle to the fifth lens can be appropriately controlled. As a result, the astigmatism, the field curvature and the distortion can be properly corrected.

According to the imaging lens having the above-described configuration, it is preferable that the following conditional expression (1) is satisfied:

$$11.00 < vd2 < 27.00 \qquad (1)$$

where
  vd2: an abbe number at d-ray of the second lens.

The conditional expression (1) defines an appropriate range of the abbe number at d-ray of the second lens. By satisfying the conditional expression (1), the chromatic aberration can be properly corrected.

According to the imaging lens having the above-described configuration, it is preferable that the following conditional expression (2) is satisfied:

$$-1.55 < f3/f < -0.20 \quad (2)$$

where
- f3: a focal length of the third lens, and
- f: a focal length of the overall optical system of the imaging lens.

The conditional expression (2) defines an appropriate range of the focal length of the third lens. By satisfying the conditional expression (2), the negative refractive power of the third lens becomes appropriate, and the chromatic aberration, the coma aberration, the astigmatism and the distortion can be properly corrected.

According to the imaging lens having the above-described configuration, it is preferable that the following conditional expression (3) is satisfied:

$$0.25 < r3/f < 5.00 \quad (3)$$

where
- r3: a paraxial curvature radius of an object-side surface of the second lens, and
- f: a focal length of the overall optical system of the imaging lens.

The conditional expression (3) defines an appropriate range of the paraxial curvature radius of the object-side surface of the second lens. By satisfying the conditional expression (3), the coma aberration and the astigmatism can be properly corrected.

According to the imaging lens having the above-described configuration, it is preferable that the following conditional expression (4) is satisfied:

$$9.00 < (D6/f6) \times 100 \quad (4)$$

where
- D6: a thickness along the optical axis of the sixth lens, and
- f6: a focal length of the sixth lens.

The conditional expression (4) defines an appropriate range of a relationship between the thickness along the optical axis of the sixth lens and the focal length of the sixth lens. By satisfying the conditional expression (4), reduction in the profile can be achieved, the refractive power of the sixth lens becomes appropriate, and the spherical aberration, the astigmatism, the field curvature and the distortion can be properly corrected.

According to the imaging lens having the above-described configuration, it is preferable that the following conditional expression (5) is satisfied:

$$0.50 < f6/f1 < 2.60 \quad (5)$$

where
- f6: a focal length of the sixth lens, and
- f1: a focal length of the first lens.

The conditional expression (5) defines an appropriate range of a relationship between the focal length of the sixth lens and the focal length of the first lens. By satisfying the conditional expression (5), refractive powers of the sixth lens and the first lens can be appropriately balanced. As a result, reduction in the profile can be achieved, and the spherical aberration, the astigmatism, the field curvature and the distortion can be properly corrected.

According to the imaging lens having the above-described configuration, it is preferable that the following conditional expression (6) is satisfied:

$$1.00 < r2/r12 < 7.50 \quad (6)$$

where
- r2: a paraxial curvature radius of an image-side surface of the first lens, and
- r12: a paraxial curvature radius of an image-side surface of the sixth lens.

The conditional expression (6) defines an appropriate range of a relationship between the paraxial curvature radius of the image-side surface of the first lens and the paraxial curvature radius of the image-side surface of the sixth lens. By satisfying the conditional expression (6), the coma aberration, the astigmatism, the field curvature and the distortion can be properly corrected.

According to the imaging lens having the above-described configuration, it is preferable that the following conditional expression (7) is satisfied:

$$0.10 < r8/f < 0.55 \quad (7)$$

where
- r8: a paraxial curvature radius of an image-side surface of the fourth lens, and
- f: a focal length of the overall optical system of the imaging lens.

The conditional expression (7) defines an appropriate range of the paraxial curvature radius of the image-side surface of the fourth lens. By satisfying the conditional expression (7), the astigmatism and the distortion can be properly corrected.

According to the imaging lens having the above-described configuration, it is preferable that the following conditional expression (8) is satisfied:

$$3.00 < (T3/f) \times 100 < 10.50 \quad (8)$$

where
- T3: a distance along the optical axis from an image-side surface of the third lens to an object-side surface of the fourth lens, and
- f: a focal length of the overall optical system of the imaging lens.

The conditional expression (8) defines an appropriate range of a distance along the optical axis from an image-side surface of the third lens to an object-side surface of the fourth lens. By satisfying the conditional expression (8), reduction in the profile can be achieved, and the astigmatism and the distortion can be properly corrected.

According to the imaging lens having the above-described configuration, it is preferable that the following conditional expression (9) is satisfied:

$$0.25 < f6/f < 1.25 \quad (9)$$

where
- f6: a focal length of the sixth lens, and
- f: a focal length of the overall optical system of the imaging lens.

The conditional expression (9) defines an appropriate range of the focal length of the sixth lens. By satisfying the conditional expression (9), reduction in the profile can be achieved, and the spherical aberration, the astigmatism, the field curvature and the distortion can be properly corrected.

According to the imaging lens having the above-described configuration, it is preferable that the following conditional expression (10) is satisfied:

$$0.01 < f1/|f4| < 0.50 \quad (10)$$

where
- f1: a focal length of the first lens, and
- f4: a focal length of the fourth lens.

The conditional expression (10) defines an appropriate range of a relationship between the focal length of the first lens and the focal length of the fourth lens. By satisfying the conditional expression (10), refractive powers of the first lens and the fourth lens can be appropriately balanced. As a result, reduction in the profile can be achieved, and the spherical aberration, the astigmatism and the distortion can be properly corrected.

According to the imaging lens having the above-described configuration, it is preferable that the following conditional expression (11) is satisfied:

$$-15.00 < r2/r4 < -1.00 \tag{11}$$

where
- r2: a paraxial curvature radius of an image-side surface of the first lens, and
- r4: a paraxial curvature radius of an image-side surface of the second lens.

The conditional expression (11) defines an appropriate range of a relationship between the paraxial curvature radius of the image-side surface of the first lens and the paraxial curvature radius of the image-side surface of the second lens. By satisfying the conditional expression (11), the coma aberration and the astigmatism can be properly corrected.

According to the imaging lens having the above-described configuration, it is preferable that the following conditional expression (12) is satisfied:

$$1.00 < r3/r4 < 6.00 \tag{12}$$

where
- r3: a paraxial curvature radius of an object-side surface of the second lens, and
- r4: a paraxial curvature radius of an image-side surface of the second lens.

The conditional expression (12) defines an appropriate range of a relationship between the paraxial curvature radius of the object-side surface of the second lens and the paraxial curvature radius of the image-side surface of the second lens. By satisfying the conditional expression (12), the coma aberration, the astigmatism and the distortion can be properly corrected.

According to the imaging lens having the above-described configuration, it is preferable that the following conditional expression (13) is satisfied:

$$-7.00 < r2/r4/r6 < -0.20 \tag{13}$$

where
- r2: a paraxial curvature radius of an image-side surface of the first lens,
- r4: a paraxial curvature radius of an image-side surface of the second lens, and
- r6: a paraxial curvature radius of an image-side surface of the third lens.

The conditional expression (13) defines an appropriate range of a relationship between the paraxial curvature radius of the image-side surface of the first lens, the paraxial curvature radius of the image-side surface of the second lens, and the paraxial curvature radius of the image-side surface of the third lens. By satisfying the conditional expression (13), the coma aberration, the astigmatism and the distortion can be properly corrected.

According to the imaging lens having the above-described configuration, it is preferable that the following conditional expression (14) is satisfied:

$$-5.50 < r2/f < -0.50 \tag{14}$$

where
- r2: a paraxial curvature radius of an image-side surface of the first lens, and
- f: a focal length of the overall optical system of the imaging lens.

The conditional expression (14) defines an appropriate range of the paraxial curvature radius of the image-side surface of the first lens. By satisfying the conditional expression (14), the coma aberration and the astigmatism can be properly corrected.

According to the imaging lens having the above-described configuration, it is preferable that the following conditional expression (15) is satisfied:

$$0.10 < r7/f < 0.75 \tag{15}$$

where
- r7: a paraxial curvature radius of an object-side surface of the fourth lens, and
- f: a focal length of the overall optical system of the imaging lens.

The conditional expression (15) defines an appropriate range of the paraxial curvature radius of the object-side surface of the fourth lens. By satisfying the conditional expression (15), the coma aberration and the astigmatism can be properly corrected.

According to the imaging lens having the above-described configuration, it is preferable that the following conditional expression (16) is satisfied:

$$-0.95 < r12/f < -0.10 \tag{16}$$

where
- r12: a paraxial curvature radius of an image-side surface of the sixth lens, and
- f: a focal length of the overall optical system of the imaging lens.

The conditional expression (16) defines an appropriate range of the paraxial curvature radius of the image-side surface of the sixth lens. By satisfying the conditional expression (16), the astigmatism, the field curvature and the distortion can be properly corrected.

According to the imaging lens having the above-described configuration, it is preferable that the following conditional expression (17) is satisfied:

$$-8.50 < r12/D6 < -1.50 \tag{17}$$

where
- r12: a paraxial curvature radius of an image-side surface of the sixth lens, and
- D6: a thickness along the optical axis of the sixth lens.

The conditional expression (17) defines an appropriate range of a relationship between the paraxial curvature radius of the image-side surface of the sixth lens and the thickness along the optical axis of the sixth lens. By satisfying the conditional expression (17), reduction in the profile can be achieved, and the astigmatism, the field curvature and the distortion can be properly corrected.

Effect of Invention

According to the present invention, there can be provided an imaging lens with high resolution which satisfies demand of the low profile and the low F-number in well balance, and properly corrects aberrations.

DETAILED DESCRIPTION OF THE PREFERRED EMBODIMENT

Hereinafter, the preferred embodiment of the present invention will be described in detail referring to the accompanying drawings.

Figure 1:
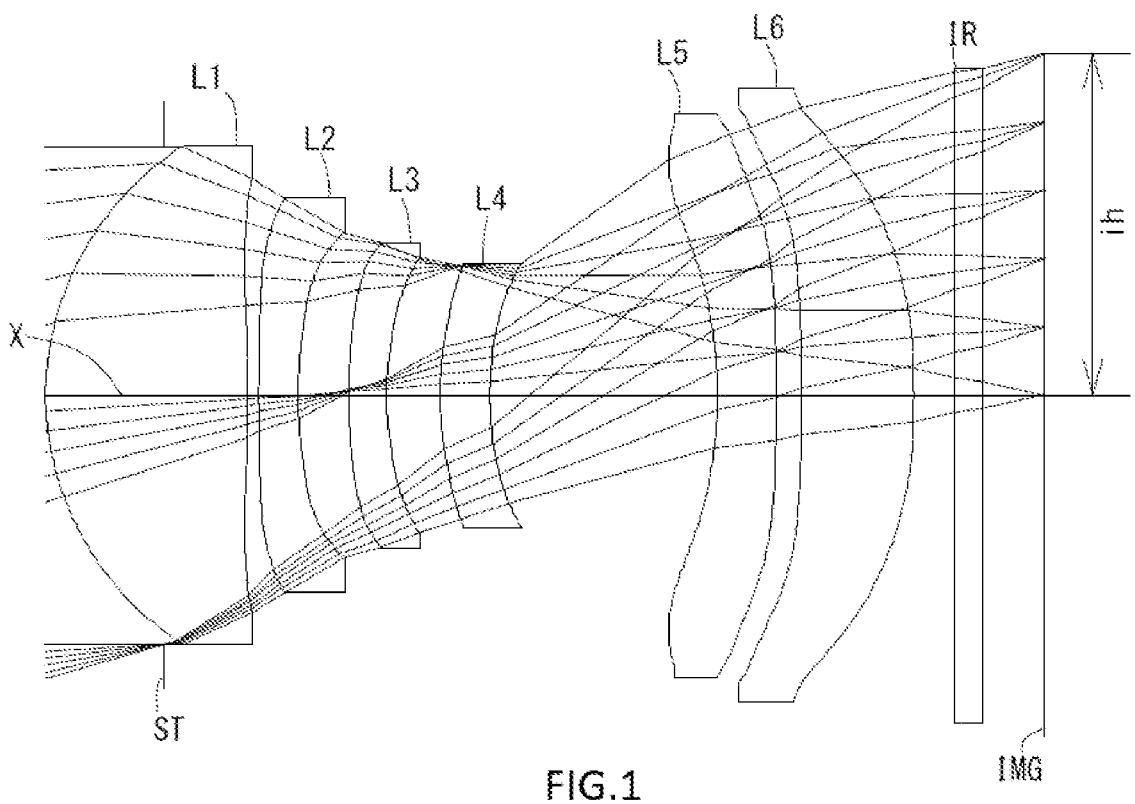
FIG. 1 is a schematic view showing an imaging lens in Example 1 according to the present invention.
Figure 3:
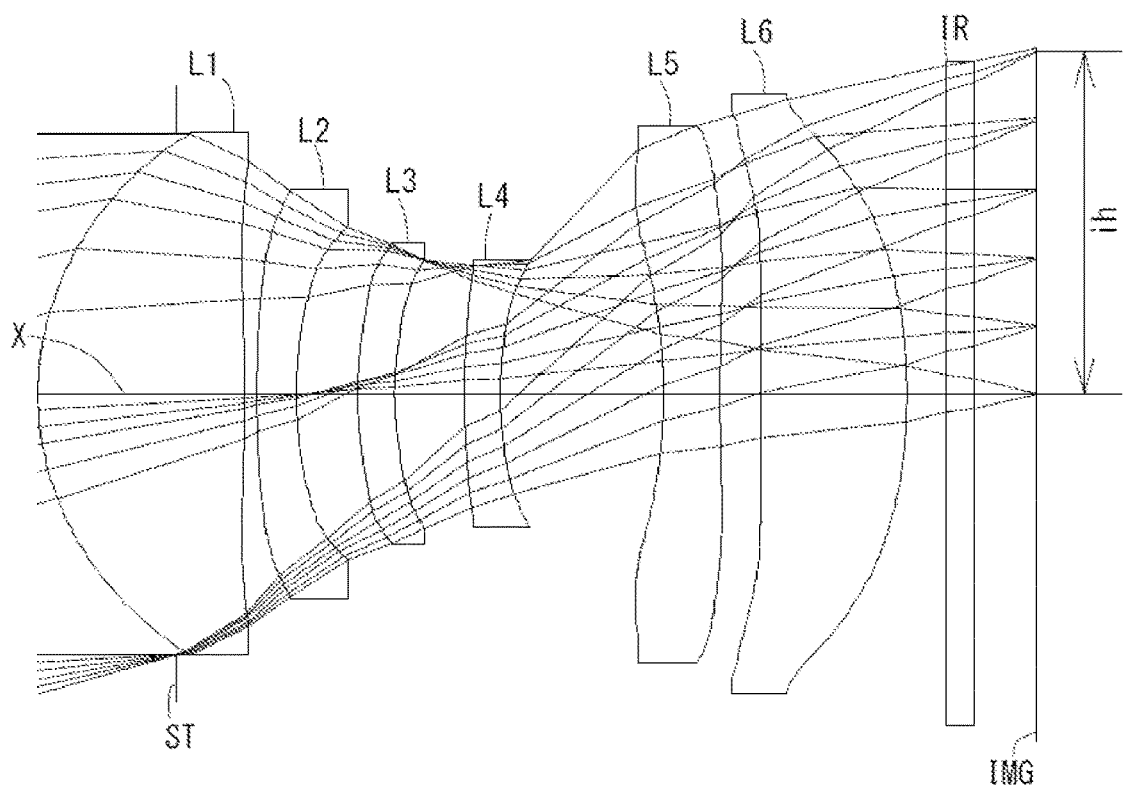
FIG. 3 is a schematic view showing an imaging lens in Example 2 according to the present invention.
Figure 5:
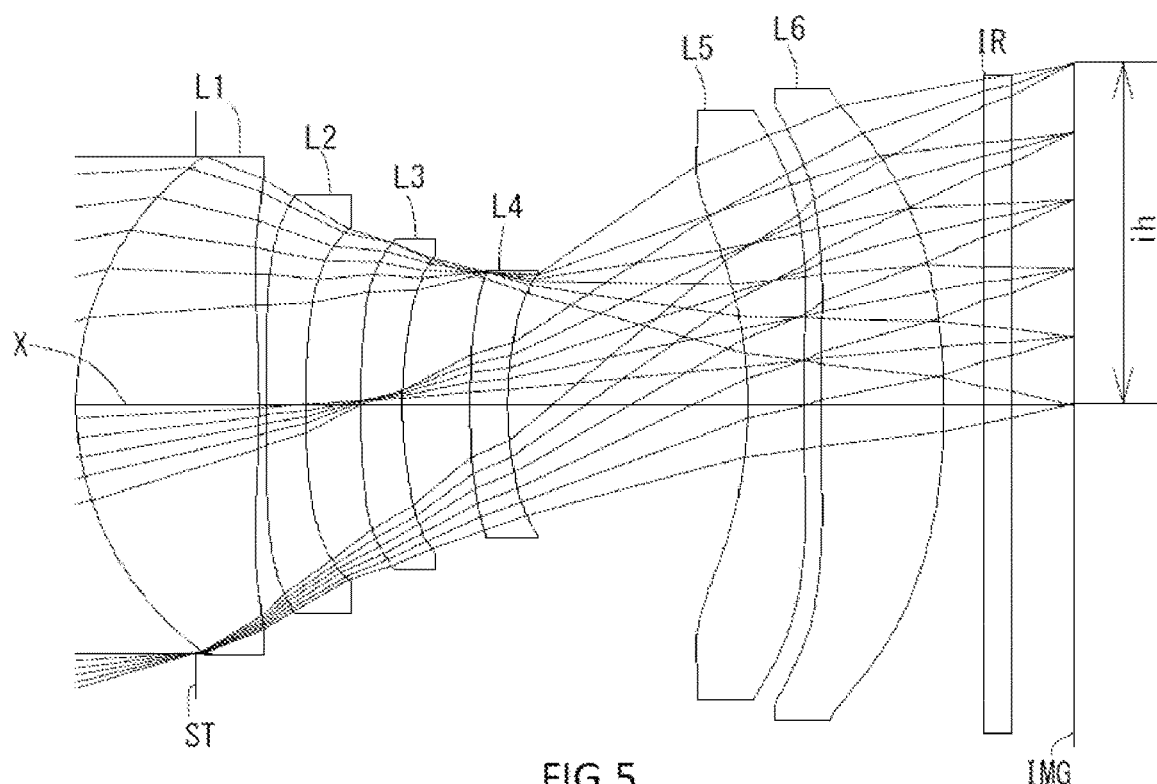
FIG. 5 is a schematic view showing an imaging lens in Example 3 according to the present invention.

FIGS. 1, 3 and 5 are schematic views of the imaging lenses in Examples 1 to 3 according to the embodiments of the present invention, respectively.

The imaging lens according to the present invention comprises, in order from an object side to an image side, a first lens L1 with positive refractive power having an object-side surface being convex in a paraxial region, a second lens L2 with negative refractive power in a paraxial region, a third lens L3 with negative refractive power having an object-side surface being convex in a paraxial region, a fourth lens L4 having an object-side surface being convex in a paraxial region, a fifth lens L5 with negative refractive power in a paraxial region, and a sixth lens L6 with positive refractive power having an image-side surface being convex in a paraxial region.

A filter IR such as an IR cut filter or a cover glass is arranged between the sixth lens L6 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a biconvex shape having the object-side surface being convex and an image-side surface being convex in a paraxial region (near the optical axis X). Therefore, reduction in a profile is achieved and spherical aberration, coma aberration, astigmatism and distortion are properly suppressed by strengthening the refractive power.

The second lens L2 has the negative refractive power and is formed in a meniscus shape having an object-side surface being convex and an image-side surface being concave in a paraxial region (near the optical axis X). Therefore, the spherical aberration, chromatic aberration, the coma aberration, the astigmatism and the distortion are properly corrected.

The third lens L3 has the negative refractive power and is formed in a meniscus shape having an object-side surface being convex and an image-side surface being concave in a paraxial region (near the optical axis X). Therefore, the chromatic aberration, the coma aberration, the astigmatism and the distortion are properly corrected.

The fourth lens L4 has positive refractive power and is formed in a meniscus shape having an object-side surface being convex and an image-side surface being concave in a paraxial region (near the optical axis X). Therefore, the astigmatism and the distortion are properly corrected.

Additionally, the fourth lens L4 may have negative refractive power as in the Examples 2 and 3 shown in FIGS. 3 and 5. In this case, correction of the chromatic aberration is favorably made.

The fifth lens L5 has the negative refractive power and is formed in a concave-flat shape having an object-side surface being concave and an image-side surface being flat in a paraxial region (near the optical axis X). Therefore, the chromatic aberration, the astigmatism, the field curvature and the distortion are properly corrected. Furthermore, when the image-side surface is flat in the paraxial region, the astigmatism, the field curvature and the distortion are properly corrected by an aspheric surface on the image side without affecting a focal length of the overall optical system of the imaging lens.

The fifth lens L5 may be formed in a biconcave shape having the object-side surface being concave and the image-side surface being concave in a paraxial region (near the optical axis X) as in the Example 2 shown in FIG. 3. In this case, the chromatic aberration can be more properly corrected by the negative refractive power of both sides.

The sixth lens L6 has the positive refractive power and is formed in a flat-convex shape having an object-side surface being flat and an image-side surface being convex in a paraxial region (near the optical axis X). Therefore, reduction in the profile is achieved and the spherical aberration, the astigmatism, the field curvature and the distortion are properly corrected. Furthermore, when the object-side surface is flat in the paraxial region, the astigmatism, the field curvature and the distortion are properly corrected by an aspheric surface on the object side without affecting a focal length of the overall optical system of the imaging lens.

The sixth lens L6 may be formed in a biconvex shape having the object-side surface being convex and the image-side surface being convex in a paraxial region (near the optical axis X) as in the Example 2 shown in FIG. 3. In this case, it becomes favorable for reducing the profile by positive refractive power of both sides.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in low cost becomes possible.

Furthermore, the imaging lens according to the present embodiments makes manufacturing facilitated by using a plastic material for the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (17).

$$11.00 < vd2 < 27.00 \tag{1}$$

$$-1.55 < f3/f < -0.20 \tag{2}$$

$$0.25 < r3/f < 5.00 \tag{3}$$

$$9.00 < (D6/f6) \times 100 \tag{4}$$

$0.50<f6/f1<2.60$ (5)

$1.00<r2/r12<7.50$ (6)

$0.10<r8/f<0.55$ (7)

$3.00<(T3/f)\times100<10.50$ (8)

$0.25<f6/f<1.25$ (9)

$0.01<f1/|f4|<0.50$ (10)

$-15.00<r2/r4<-1.00$ (11)

$1.00<r3/r4<6.00$ (12)

$-7.00<r2/r4/r6<-0.20$ (13)

$-5.50<r2/f<-0.50$ (14)

$0.10<r7/f<0.75$ (15)

$-0.95<r12/f<-0.10$ (16)

$-8.50<r12/D6<-1.50$ (17)

where vd2: an abbe number at d-ray of the second lens L2,

D6: a thickness along the optical axis X of the sixth lens L6,

T3: a distance along the optical axis X from an image-side surface of the third lens L3 to an object-side surface of the fourth lens L4, f: a focal length of the overall optical system of the imaging lens, f1: a focal length of the first lens L1, f3: a focal length of the third lens L3, f4: a focal length of the fourth lens L4, f6: a focal length of the sixth lens L6, r2: a paraxial curvature radius of an image-side surface of the first lens L1, r3: a paraxial curvature radius of an object-side surface of the second lens L2, r4: a paraxial curvature radius of an image-side surface of the second lens L2, r6: a paraxial curvature radius of an image-side surface of the third lens L3, r7: a paraxial curvature radius of an object-side surface of the fourth lens L4, r8: a paraxial curvature radius of an image-side surface of the fourth lens L4, and r12: a paraxial curvature radius of an image-side surface of the sixth lens L6.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (17a).

$15.00<vd2<23.00$ (1a)

$-1.45<f3/f<-0.55$ (2a)

$0.55<r3/f<3.50$ (3a)

$9.50<(D6/f6)\times100<30.00$ (4a)

$1.30<f6/f1<2.40$ (5a)

$2.00<r2/r12<6.00$ (6a)

$0.20<r8/f<0.45$ (7a)

$4.00<(T3/f)\times100<8.00$ (8a)

$0.55<f6/f<1.10$ (9a)

$0.01<f1/|f4|<0.40$ (10a)

$-11.00<r2/r4<-1.75$ (11a)

$1.70<r3/r4<4.50$ (12a)

$-5.00<r2/r4/r6<-0.45$ (13a)

$-4.00<r2/f<-1.10$ (14a)

$0.20<r7/f<0.60$ (15a)

$-0.80<r12/f<-0.40$ (16a)

$-7.50<r12/D6<-3.50$ (17a)

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1+\sqrt{1-(k+1)\frac{H^2}{R^2}}} + A_4H^4 + A_6H^6 + A_8H^8 + A_{10}H^{10} + A_{12}H^{12} + A_{14}H^{14} + A_{16}H^{16} + A_{18}H^{18} + A_{20}H^{20}$$ [Equation 1]

Next, examples of the imaging lens according to this embodiment will be explained. In each example, f denotes a focal length of the overall optical system of the imaging lens, Fno denotes an F-number, ω denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 8.51
Fno = 2.20
ω(°) = 16.6
h = 2.56
TTL = 7.42

Surface Data

| i | r | d | Nd | νd | |
|---|---|---|---|---|---|
| (Object) | Infinity | Infinity | | | |
| 1 (Stop) | Infinity | −0.8904 | | | |
| 2* | 2.1959 | 1.5134 | 1.544 | 55.93 | (νd1) |
| 3* | −17.4170 | 0.0798 | | | |
| 4* | 8.6586 | 0.300 | 1.671 | 19.24 | (νd2) |
| 5* | 3.3113 | 0.3843 | | | |
| 6* | 4.1265 | 0.2773 | 1.535 | 55.69 | (νd3) |
| 7* | 2.0526 | 0.4061 | | | |
| 8* | 2.4856 | 0.3712 | 1.671 | 19.24 | (νd4) |
| 9* | 2.3841 | 1.7086 | | | |
| 10* | −3.6260 | 0.4378 | 1.535 | 55.69 | (νd5) |
| 11* | Infinity | 0.1964 | | | |
| 12* | Infinity | 0.8430 | 1.671 | 19.24 | (νd6) |
| 13* | −5.6380 | 0.3000 | | | |
| 14 | Infinity | 0.2100 | 1.517 | 64.20 | |
| 15 | Infinity | 0.4682 | | | |
| Image Plane | Infinity | | | | |

Constituent Lens Data

| Lens | Start Surface | Focal Length |
|---|---|---|
| 1 | 2 | 3.683 |
| 2 | 4 | −8.178 |
| 3 | 6 | −8.010 |
| 4 | 8 | 185.816 |
| 5 | 10 | −6.780 |
| 6 | 12 | 8.406 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 1.192192E−04 | −1.145982E−01 | −2.235091E−01 | −1.530396E−01 | −1.672962E−01 | −2.568779E−01 |
| A6 | −1.563103E−03 | 3.220774E−01 | 5.545719E−01 | 4.094286E−01 | 4.750172E−01 | 6.123067E−01 |
| A8 | 9.362656E−04 | −3.933747E−01 | −6.567731E−01 | −4.252277E−01 | −6.542748E−01 | −1.248318E+00 |
| A10 | −1.838251E−04 | 2.995419E−01 | 4.728070E−01 | 1.670171E−01 | 6.739575E−01 | 2.468468E+00 |
| A12 | −1.639803E−06 | −1.533414E−01 | −2.207453E−01 | 1.804456E−01 | −5.423778E−01 | −3.848360E+00 |
| A14 | −8.736075E−06 | 5.385380E−02 | 7.248794E−02 | −3.557961E−01 | 4.046197E−01 | 4.254893E+00 |
| A16 | 3.764946E−06 | −1.257133E−02 | −1.792400E−02 | 3.053879E−01 | −2.347787E−01 | −2.943266E+00 |
| A18 | 2.799662E−07 | 1.756400E−03 | 3.111794E−03 | −1.382934E−01 | 7.558076E−02 | 1.094063E+00 |
| A20 | −1.376557E−07 | −1.105052E−04 | −2.663899E−04 | 2.577840E−02 | −9.419883E−03 | −1.642351E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −1.000000E+00 | −1.000000E+00 | 0.000000E+00 |
| A4 | −1.018950E−01 | −5.675767E−02 | 6.866677E−03 | −4.391606E−02 | −8.392370E−02 | −7.172579E−02 |
| A6 | 2.419320E−02 | 3.165572E−01 | −7.275504E−02 | 2.730147E−02 | 1.059527E−01 | 6.227615E−02 |
| A8 | 4.829894E−01 | −1.455462E+00 | 1.018317E−01 | −5.332272E−02 | −1.166082E−01 | −4.517420E−02 |
| A10 | −1.911373E+00 | 5.095359E+00 | −7.943904E−02 | 5.496099E−02 | 7.928540E−02 | 2.214168E−02 |
| A12 | 4.387173E+00 | −1.122063E+01 | 4.074116E−02 | −3.090840E−02 | −3.273086E−02 | −7.312253E−03 |
| A14 | −6.190039E+00 | 1.559049E+01 | −1.307089E−02 | 9.907116E−03 | 7.874456E−03 | 1.626680E−03 |
| A16 | 5.291223E+00 | −1.319658E+01 | 2.484084E−03 | −1.753985E−03 | −9.967510E−04 | −2.427388E−04 |
| A18 | −2.525306E+00 | 6.187461E+00 | −2.550127E−04 | 1.529955E−04 | 4.912315E−05 | 2.276763E−05 |
| A20 | 5.144859E−01 | −1.225051E+00 | 1.089299E−05 | 4.692569E−06 | 3.204726E−07 | −1.008769E−06 |

The imaging lens in Example 1 satisfies conditional expressions (1) to (17) as shown in Table 4.

Figure 2:
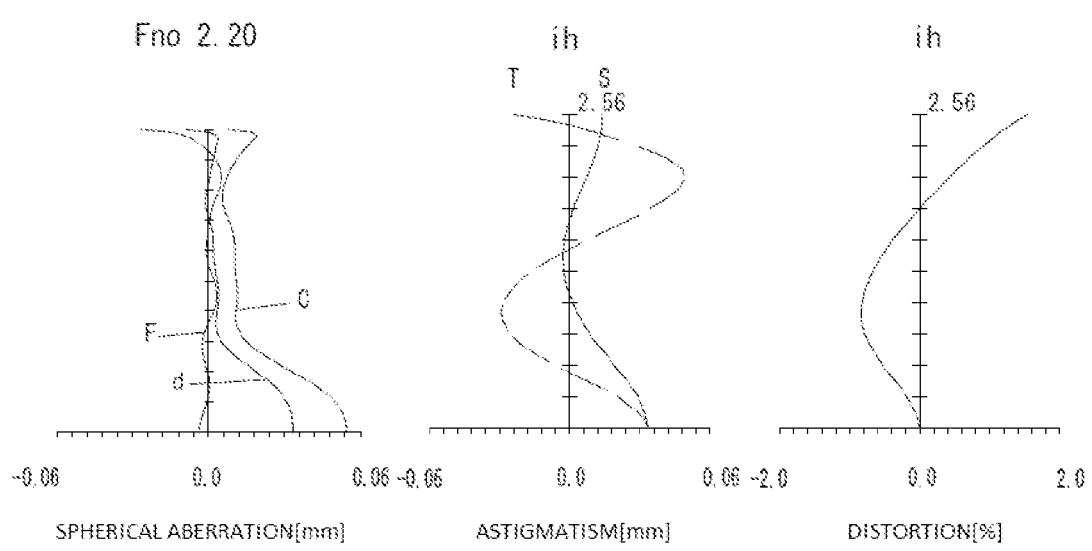
FIG. 2 shows of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and the amount of aberration at d-ray on tangential image surface T (broken line), respectively (same as FIGS. 4 and 6). As shown in FIG. 2, each aberration is corrected excellently.

Example 2

The basic lens data is shown below in Table 2.

TABLE 2

Example 2
Unit mm
f = 8.91
Fno = 2.20
ω(°) = 15.9
h = 2.56
TTL = 7.43

Surface Data

| i | r | d | Nd | vd | |
|---|---|---|---|---|---|
| (Object) | Infinity | Infinity | | | |
| 1 (Stop) | Infinity | −1.0364 | | | |
| 2* | 2.1440 | 1.5489 | 1.544 | 55.93 | (vd1) |
| 3* | −24.1024 | 0.0937 | | | |
| 4* | 7.6296 | 0.3000 | 1.671 | 19.24 | (vd2) |
| 5* | 3.3205 | 0.4598 | | | |
| 6* | 3.1614 | 0.2701 | 1.535 | 55.69 | (vd3) |
| 7* | 2.0957 | 0.5256 | | | |
| 8* | 4.8040 | 0.2700 | 1.671 | 19.24 | (vd4) |
| 9* | 2.8588 | 1.2294 | | | |
| 10* | −4.1641 | 0.4250 | 1.535 | 55.69 | (vd5) |
| 11* | 16.0737 | 0.3116 | | | |
| 12* | 37.4368 | 1.0861 | 1.671 | 19.24 | (vd6) |
| 13* | −5.7254 | 0.3000 | | | |
| 14 | Infinity | 0.2100 | 1.517 | 64.20 | |
| 15 | Infinity | 0.4683 | | | |
| Image Plane | Infinity | | | | |

Constituent Lens Data

| Lens | Start Surface | Focal Length |
|---|---|---|
| 1 | 2 | 3.694 |
| 2 | 4 | −9.017 |
| 3 | 6 | −12.750 |
| 4 | 8 | −11.147 |
| 5 | 10 | −6.139 |
| 6 | 12 | 7.479 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −4.967224E−03 | −8.127385E−02 | −1.437411E−01 | −7.975865E−02 | −7.480938E−02 | −2.682216E−01 |
| A6 | 1.367610E−03 | 2.693748E−01 | 5.291977E−01 | 4.536359E−01 | −1.339880E−01 | 7.483837E−01 |
| A8 | −3.403547E−04 | −3.791375E−01 | −8.832987E−01 | −1.043986E+00 | 1.371246E+00 | −2.084666E+00 |
| A10 | −9.962342E−05 | 3.087148E−01 | 8.454670E−01 | 1.459922E+00 | −4.704086E+00 | 3.313014E+00 |
| A12 | 7.287201E−06 | −1.553225E−01 | −4.966535E−01 | −1.363003E+00 | 9.220277E+00 | −9.016968E−01 |
| A14 | 1.023636E−06 | 4.939310E−02 | 1.893176E−01 | 8.982123E−01 | −1.059213E+01 | 4.765006E+00 |
| A16 | 5.171629E−07 | −9.744119E−03 | −4.782381E−02 | −3.739130E−01 | 7.133467E+00 | 7.552746E+00 |
| A18 | 5.576206E−07 | 1.095145E−03 | 7.514036E−03 | 7.835436E−02 | −2.615158E+00 | −4.740658E+00 |
| A20 | −1.873066E−07 | −5.379630E−05 | −5.560949E−04 | 4.905388E−03 | 4.009730E−01 | 1.111460E+00 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −1.574627E−01 | 8.139568E−04 | 2.560890E−02 | −3.183275E−02 | −7.446005E−02 | −9.728859E−02 |
| A6 | 8.205243E−01 | −1.765997E−01 | −1.388861E−01 | 7.288241E−02 | 1.453712E−01 | 1.109000E−01 |
| A8 | −5.217504E+00 | 9.883232E−01 | 2.498566E−01 | −1.466443E−01 | −1.601737E−01 | −8.926883E−02 |
| A10 | 2.081866E+01 | −1.585944E+00 | −2.467118E−01 | 1.456748E−01 | 9.414633E−02 | 4.697669E−02 |
| A12 | −4.959754E+01 | 2.505121E−01 | 1.542591E−01 | −8.252321E−02 | −3.082986E−02 | −1.742937E−02 |
| A14 | 7.282957E+01 | 3.285564E+00 | −6.032287E−02 | 2.789003E−02 | 5.141795E−03 | 4.588697E−03 |
| A16 | −6.481432E+01 | −5.429720E+00 | 1.414678E−02 | −5.520000E−03 | −2.198464E−04 | −8.066485E−04 |
| A18 | 3.205178E+01 | 3.611786E+00 | −1.814875E−03 | 5.851790E−04 | −4.764661E−05 | 8.324006E−05 |
| A20 | −6.760000E+00 | −8.900000E−01 | 9.788371E−05 | −2.542175E−05 | 4.941439E−06 | −3.740522E−06 |

The imaging lens in Example 2 satisfies conditional expressions (1) to (17) as shown in Table 4.

Figure 4:
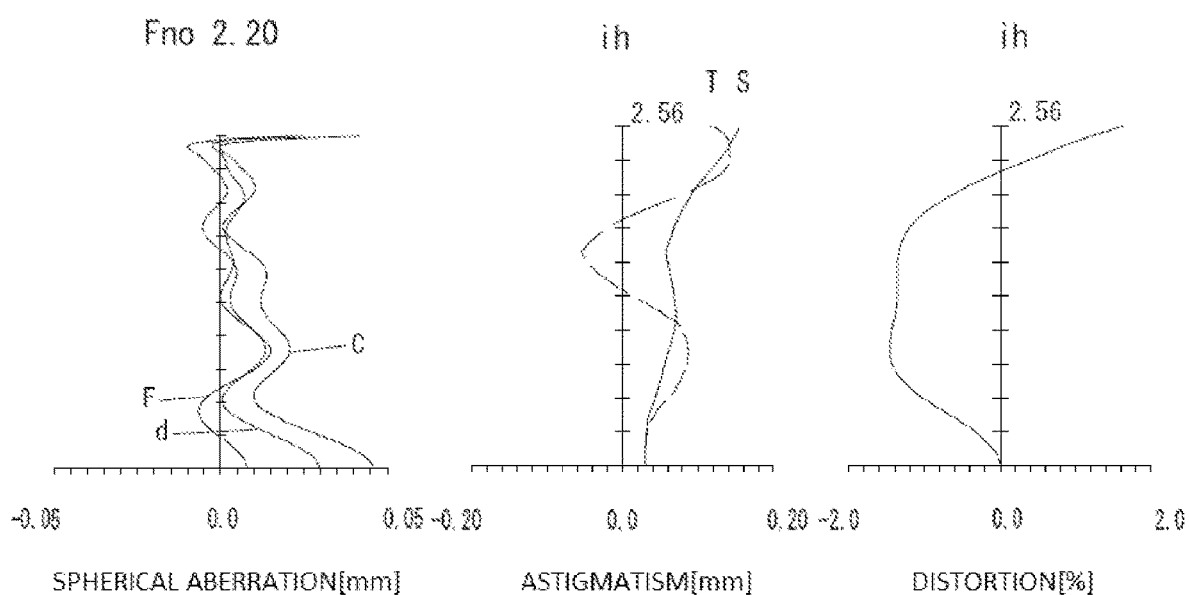
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 8.52
Fno = 2.20
ω(°) = 16.4
h = 2.56
TTL = 7.43

Surface Data

| i | r | d | Nd | νd | |
|---|---|---|----|----|---|
| (Object) | Infinity | Infinity | | | |
| 1 (Stop) | Infinity | −0.8995 | | | |
| 2* | 2.2871 | 1.3693 | 1.544 | 55.93 | (νd1) |
| 3* | −15.3383 | 0.0584 | | | |
| 4* | 18.8279 | 0.3000 | 1.671 | 19.24 | (νd2) |
| 5* | 6.4894 | 0.4083 | | | |
| 6* | 9.9497 | 0.3141 | 1.535 | 55.69 | (νd3) |
| 7* | 3.4425 | 0.5035 | | | |
| 8* | 4.2718 | 0.2874 | 1.671 | 19.24 | (νd4) |
| 9* | 2.9246 | 1.8028 | | | |
| 10* | −3.4563 | 0.4251 | 1.535 | 55.69 | (νd5) |
| 11* | Infinity | 0.1281 | | | |
| 12* | Infinity | 0.9220 | 1.671 | 19.24 | (νd6) |
| 13* | −5.5101 | 0.3000 | | | |
| 14 | Infinity | 0.2100 | 1.517 | 64.20 | |
| 15 | Infinity | 0.4689 | | | |
| Image Plane | Infinity | | | | |

Constituent Lens Data

| Lens | Start Surface | Focal Length |
|------|---------------|--------------|
| 1 | 2 | 3.760 |
| 2 | 4 | −14.909 |
| 3 | 6 | −10.010 |
| 4 | 8 | −15.121 |
| 5 | 10 | −6.463 |
| 6 | 12 | 8.215 |

Aspheric Surface Data

| | Second Surface | Third Surface | Fourth Surface | Fifth Surface | Sixth Surface | Seventh Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 1.355105E−03 | −9.797409E−02 | −1.739604E−01 | −6.758144E−02 | 2.767478E−02 | −3.219821E−02 |
| A6 | −1.768674E−03 | 3.334359E−01 | 5.632463E−01 | 3.101591E−01 | 1.255964E−01 | 1.237755E−01 |
| A8 | 1.059017E−03 | −4.899161E−01 | −8.667104E−01 | −4.198441E−01 | −2.255538E−01 | −1.893732E−01 |
| A10 | −2.168198E−04 | 4.423636E−01 | 8.291550E−01 | 2.427545E−01 | 8.570056E−02 | −2.412849E−01 |
| A12 | −6.798243E−06 | −2.579866E−01 | −5.118246E−01 | 7.809869E−02 | 2.742256E−01 | 1.557741E+00 |
| A14 | −6.113038E−06 | 9.788493E−02 | 2.060339E−01 | −2.105068E−01 | −4.054820E−01 | −2.615251E+00 |
| A16 | 4.467841E−06 | −2.340938E−02 | −5.243798E−02 | 1.407805E−01 | 2.382776E−01 | 2.212134E+00 |
| A18 | 5.361593E−07 | 3.205623E−03 | 7.633144E−03 | −4.500452E−02 | −6.294112E−02 | −9.592176E−01 |
| A20 | −2.952544E−07 | −1.914175E−04 | −4.794493E−04 | 5.837077E−03 | 5.099242E−03 | 1.666827E−01 |

| | Eighth Surface | Ninth Surface | Tenth Surface | Eleventh Surface | Twelfth Surface | Thirteenth Surface |
|---|---|---|---|---|---|---|
| k | 0.000000E+00 | 0.000000E+00 | 0.000000E+00 | −1.000000E+00 | −1.000000E+00 | 0.000000E+00 |
| A4 | −3.611356E−02 | −6.546105E−02 | 1.312439E−02 | 7.957217E−02 | 4.665122E−02 | −8.236069E−03 |
| A6 | −6.457191E−02 | 7.792336E−01 | −3.368385E−01 | −1.457823E−01 | −7.985356E−02 | −1.005658E−02 |
| A8 | 5.961301E−01 | −4.332785E+00 | 1.629967E−02 | 1.115573E−01 | 5.261129E−02 | 1.111595E−02 |
| A10 | −1.966157E+00 | 1.543132E+01 | 1.166136E−02 | −5.587786E−02 | −2.403601E−02 | −8.429528E−03 |
| A12 | 4.315867E+00 | −3.409997E+01 | −1.650791E−02 | 2.066506E−02 | 9.382848E−03 | 4.224157E−03 |
| A14 | −5.971677E+00 | 4.747420E+01 | 8.366689E−03 | −5.763605E−03 | −3.017761E−03 | −1.305856E−03 |
| A16 | 5.004747E+00 | −4.048819E+01 | −2.193626E−03 | 1.105736E−03 | 6.519138E−04 | 2.374380E−04 |
| A18 | −2.326397E+00 | 1.931294E+01 | 2.945171E−04 | −1.236683E−04 | −7.814628E−05 | −2.329908E−05 |
| A20 | 4.592638E−01 | −3.940200E+00 | −1.603394E−05 | 5.910896E−06 | 3.874142E−06 | 9.559453E−07 |

The imaging lens in Example 3 satisfies conditional expressions (1) to (17) as shown in Table 4.

Figure 6:
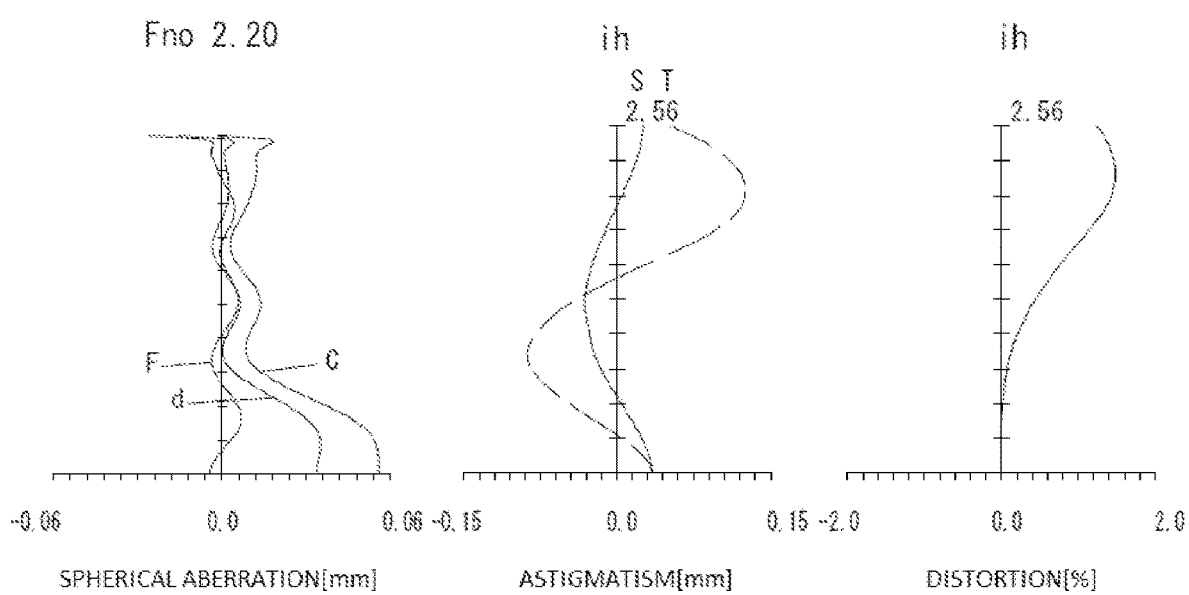
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

In table 4, values of conditional expressions (1) to (17) related to Examples 1 to 3 are shown.

TABLE 4

| Conditional Expressions | | Example 1 | Example 2 | Example 3 |
|---|---|---|---|---|
| (1) | vd 2 | 19.24 | 19.24 | 19.24 |
| (2) | f3/f | −0.94 | −1.43 | −1.18 |
| (3) | r3/f | 1.02 | 0.86 | 2.21 |
| (4) | (D6/f6) × 100 | 10.03 | 14.52 | 11.22 |
| (5) | f6/f1 | 2.28 | 2.02 | 2.19 |
| (6) | r2/r12 | 3.09 | 4.21 | 2.78 |
| (7) | r8/f | 0.28 | 0.32 | 0.34 |
| (8) | (T3/f) × 100 | 4.77 | 5.90 | 5.91 |
| (9) | f6/f | 0.99 | 0.84 | 0.96 |
| (10) | f1/|f4| | 0.02 | 0.33 | 0.25 |
| (11) | r2/r4 | −5.26 | −7.26 | −2.36 |
| (12) | r3/r4 | 2.61 | 2.30 | 2.90 |
| (13) | r2/r4/r6 | −2.56 | −3.46 | −0.69 |
| (14) | r2/f | −2.05 | −2.71 | −1.80 |
| (15) | r7/f | 0.29 | 0.54 | 0.50 |
| (16) | r12/f | −0.66 | −0.64 | −0.65 |
| (17) | r12/D6 | −6.69 | −5.27 | −5.98 |

When the imaging lens according to the present invention is adopted to a product with the camera function, there is realized contribution to the low profile and the low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising, in order from an object side to an image side:
a first lens with positive refractive power having an object-side surface being convex in a paraxial region;
a second lens with negative refractive power in a paraxial region;
a third lens with negative refractive power having an object-side surface being convex in a paraxial region;
a fourth lens having an object-side surface being convex in a paraxial region;
a fifth lens with negative refractive power in a paraxial region; and
a sixth lens with positive refractive power having an image-side surface being convex in a paraxial region, wherein the following conditional expressions (1), (2), (3) and (17) are satisfied:

$$11.00 < vd2 < 27.00 \quad (1)$$

$$-1.55 < f3/f < -0.20 \quad (2)$$

$$0.25 < r3/f < 5.00 \quad (3)$$

$$-8.50 < r12/D6 < -1.50 \quad (17)$$

where
vd2: an abbe number at d-ray of the second lens, f3: a focal length of the third lens,
f: a focal length of the overall optical system of the imaging lens,
r3: a paraxial curvature radius of an object-side surface of the second lens;
r12: a paraxial curvature radius of an image-side surface of the sixth lens, and
D6: a thickness along the optical axis of the sixth lens.

2. The imaging lens according to claim 1, wherein an image-side surface of said first lens is convex in a paraxial region.

3. The imaging lens according to claim 1, wherein an object-side surface of said fifth lens is concave in a paraxial region.

4. The imaging lens according to claim 1, wherein the following conditional expression (4) is satisfied:

$$9.00 < (D6/f6) \times 100 \quad (4)$$

where
D6: a thickness along the optical axis of the sixth lens, and
f6: a focal length of the sixth lens.

5. The imaging lens according to claim 1, wherein the following conditional expression (5) is satisfied:

$$0.50 < f6/f1 < 2.60 \quad (5)$$

where
f6: a focal length of the sixth lens, and f1: a focal length of the first lens.

6. The imaging lens according to claim 1, wherein the following conditional expression (6) is satisfied:

$$1.00 < r2/r12 < 7.50 \quad (6)$$

where
r2: a paraxial curvature radius of an image-side surface of the first lens, and r12: a paraxial curvature radius of an image-side surface of the sixth lens.

7. The imaging lens according to claim 1, wherein the following conditional expression (7) is satisfied:

$$0.10 < r8/f < 0.55 \quad (7)$$

where
r8: a paraxial curvature radius of an image-side surface of the fourth lens, and f: a focal length of the overall optical system of the imaging lens.

* * * * *